United States Patent [19]

Rutishauser

[11] Patent Number: 4,890,826
[45] Date of Patent: Jan. 2, 1990

[54] SORTING APPARATUS FOR SHEETS

[75] Inventor: Thomas Rutishauser, Uerikon, Switzerland

[73] Assignee: Rutishauser Data AG, Stäfa, Switzerland

[21] Appl. No.: 227,827

[22] Filed: Aug. 3, 1988

[30] Foreign Application Priority Data

Aug. 7, 1987 [CH] Switzerland ............... 03045/87

[51] Int. Cl.⁴ ............................................. B65H 39/10
[52] U.S. Cl. ................................ 271/296; 271/279;
271/287; 271/302; 271/303; 271/304
[58] Field of Search ............... 271/296, 287, 299, 304, 271/303, 300, 302, 279

[56] References Cited

U.S. PATENT DOCUMENTS 3,356,362 12/1967 Mestre ............................ 271/296 X
4,607,838 8/1986 Matsuyama et al. ........... 271/302 X
4,822,025 4/1989 Chung ............................... 271/302 X

FOREIGN PATENT DOCUMENTS 0259828 3/1988 European Pat. Off. ............ 271/296
55-165855 12/1980 Japan .

OTHER PUBLICATIONS

Bevil et al, "Removable Collator Bins," IBM Tech. Disclosure Bulletin, vol. 19, No. 7, 12-76.
Haltiner, "Sorter with a Movable Transport," Xerox Disclosure Bulletin, vol. 9, No. 6, 11/84.

*Primary Examiner*—H. Grant Skaggs
*Assistant Examiner*—Boris Milef
*Attorney, Agent, or Firm*—Toren, McGeady & Associates

[57] ABSTRACT

A sorting apparatus for sheets which are supplied from an office machine such as a printer, comprises a take-up site for receiving the sheet from the printer and a plurality of output sites. The sheet can be deposited into any one of the output sites. A support carries pairs of engaged rollers which define a feed channel for a sheet. The feed channel has an inlet end which is alignable with the take-up site for receiving a sheet from the office machine. The support can be pivoted about a swiveling axis to bring the outlet end of the channel to any one of the output sites. A control mechanism is connected to a stepper motor which engages the support for rotating the support about its swiveling axis.

7 Claims, 3 Drawing Sheets

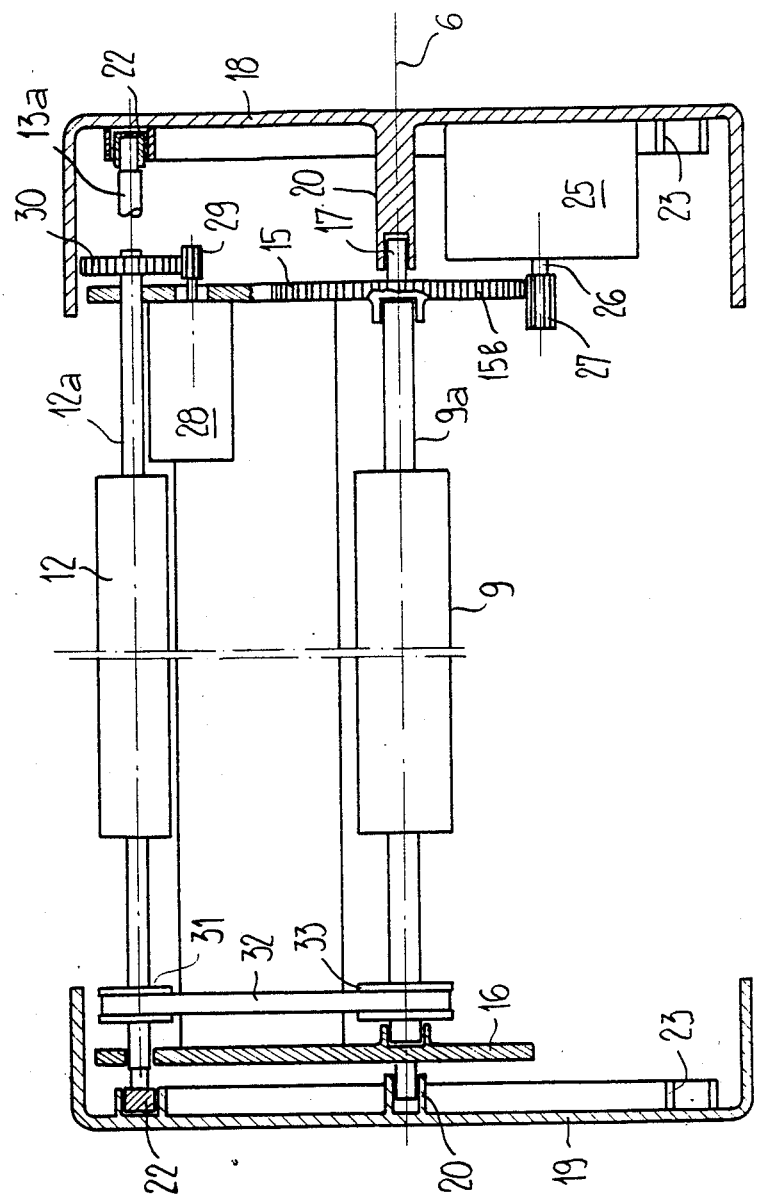

SORTING APPARATUS FOR SHEETS

BACKGROUND OF THE INVENTION

Field of the Invention

The invention is directed to a sorting apparatus for sheets, such as charts, recording media or drawings, which are delivered from an office machine.

A known sorting apparatus of this type comprises a pair of rollers which are movable on a linear path. The path extends along a series of sorter pockets which form output sites and extends transversely relative to a feed gap or nip of the pair of rollers, or the feed direction of the rollers. This feed direction is laid out parallel to the direction in which the office machine ejects the sheets. The path allows the pair of rollers to make use of a take-up or transfer site and, in so doing, to occupy a position in which the feed gap is aligned with the ejection direction of the office machine.

As soon as a sheet runs into the feed gap in this position of the pair of rollers, or is grasped by the rotating rollers, the rotation of the rollers is interrupted. The pair of rollers is then moved on the path and brought into a position which is aligned with a predetermined sorter pocket. The sheet is then fed into the sorter pocket by means of the rotation of the rollers which is started again in this position. The use of the known sorting apparatus is limited to cases in which the office machine ejects the sheet approximately horizontally and the overhang or space requirement of the sorter pockets in this direction is acceptable. These conditions particularly impair the use of the known sorting apparatus as an added device for the subsequent outfitting of office machines.

SUMMARY OF THE INVENTION

An object of the present invention is to provide an inexpensive sorting apparatus which provides possibilities of selection with respect to the arrangement relative to the office machine and the position of the take-over place, as well as with respect to the position of the output places.

Another object of the invention is to provide a sorting apparatus of the indicated kind which is extremely reliable for receiving and ejecting sheets.

Accordingly, another object of the present invention is to provide an apparatus for sorting sheets comprising a support mounted for rotation about a swiveling axis, a pair of driven circulating members defining a feed channel mounted to the support, the feed channel having an inlet end and an outlet end, means defining a take-up site for receiving sheets to be sorted, means defining a plurality of outputs for receiving sheets to be sorted, drive means connected to the support for rotating the support on its swiveling axis, and control means connected to the drive means for rotating the support to align the inlet end of the feed channel with the take-up site for receiving a sheet into the feed channel, and for rotating the supports to align the outlet end of the feed channel to one of the output sites for discharging a sheet from the channel into the output step.

The swivelable support of the feed gap allows the position of the take-up site with respect to the swiveling axis, as well as that of the output sites at the circumference of the swiveling axis, to be freely selected within a wide range. Thus, in particular, the take-up site need not only be aligned horizontally with the swiveling axis, but can also be located above or below the axis. On the other hand, output sites can also be located above or below the swiveling axis. Accordingly, it is possible, for example, to let the sheets be taken up from the office machine by means of a first sorting apparatus and to transfer some of these sheets to one or more additional sorting apparatuses, according to the invention, which are controlled, e.g. by means of the first sorting apparatus. Consequently, the quantity of serviceable output sites or available depositing possibilities, e.g. sorting pockets, can also be increased subsequently if necessary.

In an advantageous manner, the feed gap forms at least one part of the feed channel, wherein, in the case of circulating members constructed as endless belts, the latter can completely define the feed channel in its length if necessary.

The construction of the feed gap as a feed channel provides the advantage over the known sorting apparatus that the feeding of the sheets, e.g. a sheet of paper, which are drawn into the feed channel during the aligning movement of same, need not be interrupted. The maximum time required for the alignment of the feed channel can be selected by means of correspondingly selecting the angular velocity of the feed channel in such a way that the latter has achieved a selected output position before the sheet of paper has arrived at the end of the feed channel. Consequently, the controlling means for the sheet in the feed channel can be simplified, since the need to interrupt the feed drive and put it in operation again is dispensed with. Moreover, a higher sorting speed or output also results from this, since time losses from delaying and accelerating the drive and feed members during the sorting procedure are dispensed with.

In order not only to align the sheet with an output site, but also to adapt its outlet opening to the direction in which the sorter pockets extend, it is advantageous to construct the course of the feed channel so as to be adjustable and to carry out the adjustment as a function of a desired outlet direction. For this purpose, a pair of rollers is preferably provided at the outlet side of the feed channel, the feed gap of the pair of rollers being swivelable with reference to the direction of the feed gap of the circulating members. For this purpose, one of the two rollers of the roller pair on the outlet side is advantageously swivelable around the other of the two rollers and is influenced by a steering arrangement which adjusts the roller as a function of the direction of the feed gap of the circulating members.

It is also possible in an analogous manner to arrange the pair of rollers at the feed side of the feed channel so as to be swivelable relative to the channel. This enables the pair of rollers on the feed side to grasp another sheet or to let it be taken over before the feed channel is returned in its entirety to the initial position corresponding to the take-up side. Obviously, the sorting output of the apparatus can be further increased in this manner.

The sorting apparatus, according to the invention, as an added device or unit for an office machine, can be constructed as an independent unit with its own housing or can be integrated in the office machine.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the inventive sorting apparatus and method.

BRIEF DESCRIPTION OF THE DRAWING

In the drawings:

FIG. 3 is a vertical sectional view through the sorting apparatus of FIG. 2, wherein portions of the housing are omitted for the sake of clarity.

DESCRIPTION OF THE PREFERRED EMBODIMENT

Figure 1:
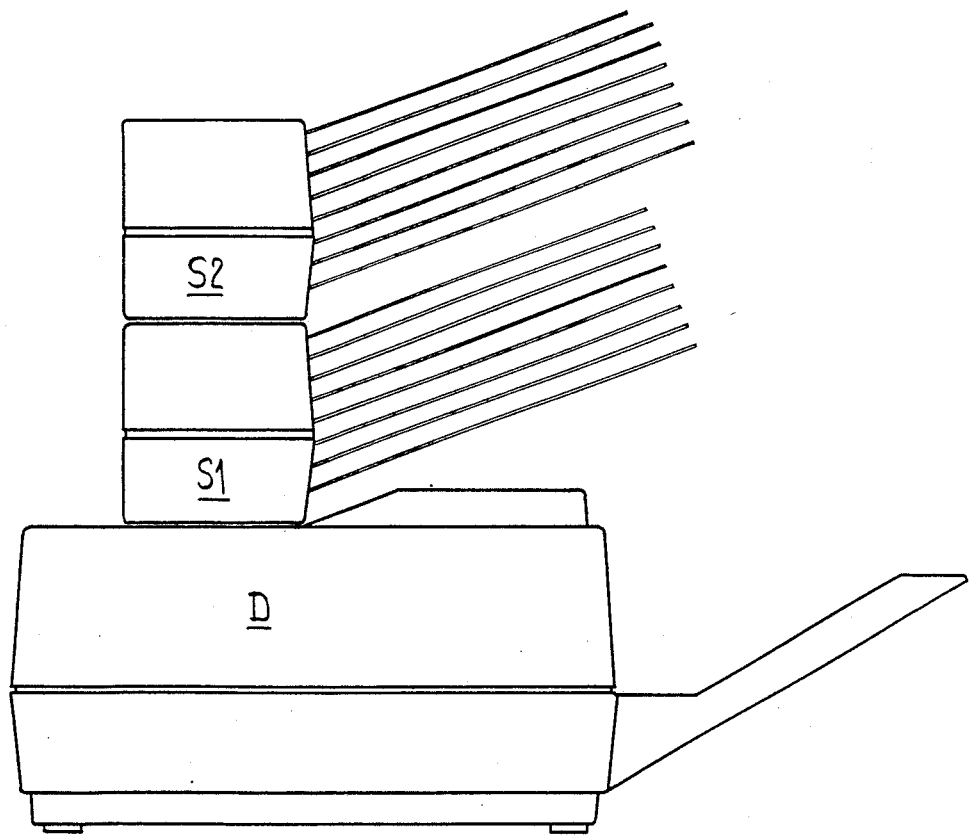
FIG. 1 is a side view of two sorting apparatuses arranged on a printer.

In the arrangement shown in FIG. 1, two identical sorting apparatuses S1 and S2, according to the invention, are placed on a printer D, wherein the sorting apparatus S2 sits on the sorting apparatus S1. Each of the sorting apparatuses comprises eight sorter pockets designated by A in FIG. 2. The printer D feeds printed sheets vertically in an upward direction through an outlet gap and consequently in the direction of the sorting apparatuses S1 and S2 arranged above the printer.

Figure 2:
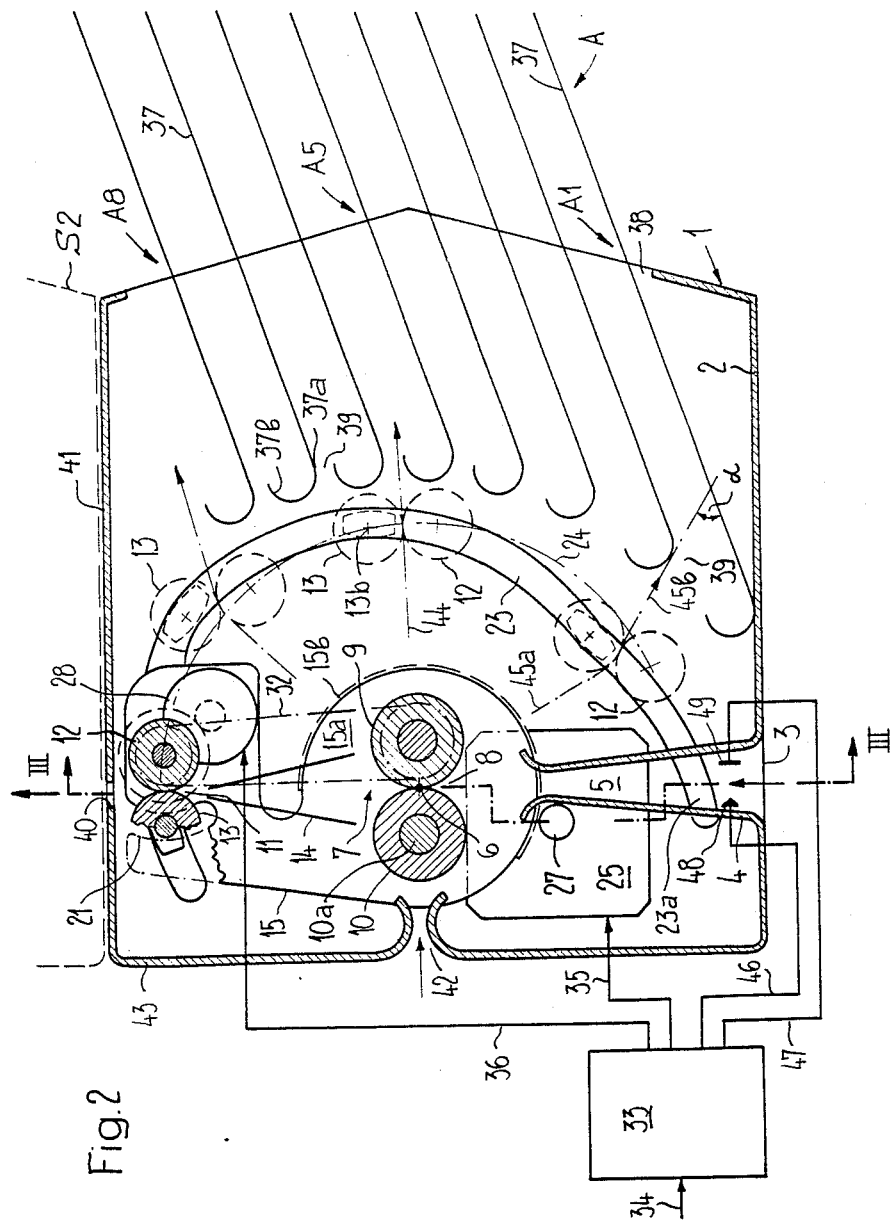
FIG. 2 is a schematic cross-sectional view through the lower one of the two sorting apparatuses according to FIG. 1.

As shown in FIG. 2, the sorting apparatus S1, which is placed directly on the printer D, comprises a housing 1 whose base 2 includes an opening or slot 3 forming a take-up site for sheets. Guiding elements 4, which project into the housing 1 from base 2, adjoin the feed opening 3 and form a vertical sheet feed path 5.

The vertical central plane of the sheet feed path 5 contains a swiveling axis 6 which is arranged above the path 5 and is shown as a point in FIG. 2. Axis 6 extends parallel to the base 2 and passes through a feed channel gap or nip, designated generally by 7, which is swivelable around the axis 6. As can also be seen in FIG. 3, the feed channel comprises a pair of circulating members in the form of rollers 9 and 10, which are arranged at a feed side or inlet end 8 of the channel. Another pair of circulating members, which are formed by means of rollers 12 and 13, are arranged on an outlet side 11 of the channel 7. A pair of guiding elements 14 extend between the roller pairs 9, 10 and 12,13 to guide sheets along channel 7. The rollers have axle ends or journals 9a, 10a, 12a, engage with two shield plates 15 and 16, which are located opposite one another, and form a unit with the rollers. The shield plates 5 and 16 are rigidly connected with one another by means of spacing elements, e.g. rods, not shown, and comprise an outwardly projecting axle end 17 in each instance. Bearing eyes 0, which receive the axle end 17 in such a way as to define the position of the swiveling axis 6, are provided in two outer wall parts 18 and 19 which lie opposite one another. Consequently, the unit comprising the feed channel 7 is swivelable around the axis 6. As a part of the feed channel, the rollers 9, 10 form a feed gap.

While the rollers 9, 10 and 12 are supported by means of their axle ends 9a, 10a and 12a directly in the shield plates 5 and 16 so as to be rotatable, the roller 13 is movable so as to swivel around the roller 12 and engages with a steering arrangement.

In the embodiment shown, the axle ends 13a of the roller 13 penetrate a circular arc-shaped guide slot 21 in the two shield plates 15 and 16 in the sense of this steering arrangement and extend on both sides in a sliding block 22, in each instance, in which they are supported so as to be rotatable. While the circular arc of the guide slots 21 have their center in the axis of the roller 12, the sliding blocks 22 are displaceable in grooves 23 forming a connecting link. The grooves 23, which are constructed identically in the side wall parts 18 and 19, extend in a curved manner and enclose the guiding axis 6 by approximately 180°.

With reference to a circular arc-shaped path 24 (FIG. 2), which is traveled by the roller 12 during the swiveling of the feed channel 7 or of the shield plates 15, 16 around the axis 6, the grooves 23 comprise portions with a smaller and a larger radius of curvature. This will be discussed in more detail in the following.

The shield plate 15 comprises the swiveling axis 6 adjacent a circular arc-shaped rack portion 15a which carries teeth 15b. A stepping motor 25, which is fastened at the side wall part 18, carries a pinion 27 on its shaft 26, which pinion 27 meshes with the teeth 15b. An electric motor 28, which drives the roller 12 via a pinion 29 and a toothed wheel 30, which is connected with one of the axle ends 12a so as to be rigid against rotation, is fastened at the shield plate 15. A pulley 31, which is placed on the other of the two axle ends 12a so as to be rigid against rotation, is connected to a pulley 33 via a drive belt 32. The pulley 33 is arranged on one of the axle ends 9a so as to be rigid against rotation. Consequently, the electric motor 28 is in a drive connection with the roller 12 as well as with the roller 9 and drives both with the same circumferential speed.

At 33 a control is indicated in a schematic manner. Input 34 of control 33 is connected to the printer D or directly to a computer (not shown). The control 33 is connected to the stepping motor 25 and to the electric motor 28 via lines 35 and 36. The control 33 is connected to a transmitter 48 and receiver 49 of a photocell via lines 46 and 47, the photocell being arranged in the vicinity of the base 2 in the sheet feed path 5.

If, as shown, another sorting apparatus S2 is placed on the sorting apparatus S1 the control 33 is also in electrical connection with this sorting apparatus and governs it also (not shown).

As can be seen in FIG. 2, the sorter pockets A are formed by means of plates 37 which are fastened in the housing 1 in a manner which is not shown, and extend through an opening 38. Each plate 37 comprises a projection 37b at its inner end 37a, which projection 37b is semicircular in cross-section, wherein the projections of adjacent plates 37 leave open an intermediate space 39 between them. The ends 37a of the plates 37 are adjacent the grooves 23.

Each of the plates 37 forms an output site with its projection 37b. Another output site is formed by means of a slot 40 in the upper wall 41 of the housing 1. Adjacent the take-up site formed by the feed opening 3, the sorting apparatus S1 comprises another take-up site which is formed by means of a feed gap 42 in a side wall 43 of the housing 1, which feed gap 42 is arranged at the height of the swiveling axis 6. In the shown arrangement of the sorting apparatus above the office machine, i.e. the printer D, the feed gap 42 remains unused.

In the operation of the sorting apparatus S1, the feed of the sheets printed by means of the printer D is effected by means of the feed opening 3, wherein the sheet guide path 5 ensures its alignment with the axis 6. When a sheet to be sorted arrives in the sheet guide path 5, the feed channel 7 is in the position shown in FIG. 2.

The photocell 48, 49 reports the arrival of a sheet in the sheet guide path 5 as a corresponding signal to the control 33 which sets the electric motor 28 in operation for the drive of the rollers 9, 10 and 12, 13. After a predetermined time interval required by the sheet in order to cover the path between the photocell 48, 49 and the feed opening, the control operates the sorting process. The sheet which is still fed by means of the printer D can consequently run into the feed channel 7 or between the feed opening and the rollers 9, 10. While the rollers 9, 10 feed the sheet from the printer through the feed channel 7 at the same speed, the channel is swiveled by means of the stepping motor 25. The swiveling is effected corresponding to a sorting signal of the printer which is processed by the control 33, in that this supplies a quantity of pulses to the stepping motor corresponding to a predetermined output site. Assuming the control 33 has assigned the output site corresponding to the sorter pocket A5 to the sorting signal obtained by the printer for the output sheet, the feed channel 7 is swiveled into the swiveling position which is indicated by means of the dash-dot arrow line 44. The assigned position of the rollers 12, 13 is drawn in a dashed line.

As explained, the circumferential position of the roller 13 relative to the roller 12 is determined by means of the configuration or the respective position of the groove 23 relative to the path 24 with reference to a determined swiveling position of the feed channel 7. In the case of the swiveling position indicated by means of the arrow line 44, the curvature radius of the groove 23 is approximately equal to the radius of the path 24, and the axis 13b of the roller 13 practically extends through the path 24. The rollers 12 and 13 can accordingly transfer the sheet without deflection into the sorter pocket A5 in the direction of the arrow line 44.

The angular velocity at which the stepping motor 25 swivels the feed channel 7 around the axis 6, is selected in such a way that it has also traveled the largest required swiveling angle, i.e. the angle for reaching the sorter pocket A1, when the start of the sheet has reached the end of the feed channel. As explained, it is assumed that the feed velocity in the feed channel is normally equal to that of the office machine, i.e. that of the printer in the present case. When the end of the sheet passes the photocell 48, 49, the latter produces another signal. The control 33 switches the electric motor 28 to a higher speed on the basis of this signal, by means of which the sheet is conveyed out of the feed channel at a higher feed velocity and is fed into the selected sorter pocket A5. The sheet arrives completely in the sorter pocket A5 with its residual movement energy and is deposited with its rear end behind the projection 37b.

In a predetermined time interval since the last signal of the photocell 48, 49—sufficient to allow the sheet to exit completely from the feed channel 7—the control 33 causes the electric motor 28 to be stopped on the one hand and the stepping motor 25 to be controlled on the other hand in order to move the feed channel back in the direction of the initial position shown in FIG. 2.

The described process is repeated as soon as the photocell 48, 49 reports the arrival of another sheet. If a sheet is brought into the sorter pocket A1, for example, the feed channel is swiveled into the direction indicated by means of the arrow line 45a. In so doing, the roller 13 also swivels relative to the roller 12 in such a way that the sheet undergoes a deflection corresponding to the arrow direction 45b when exiting from the feed channel 7. The direction of the deflection is selected in such a way that the sheet encloses the smallest possible angle a relative to the sorter pocket, i.e. its plate 37, and nevertheless reaches an intermediate space 39.

An opposite swiveling of the roller 13 relative to the roller 12 is effected in an analogous way in order to deposit a sheet in the sorter pocket A8. A deflection of the sheet is also possible in a direction which is practically parallel to the sorter pocket.

The portion of the groove designated 23a is not needed in the shown embodiment, but this allows sheets to be delivered vertically downwardly in another arrangement of the sorting apparatus S1.

To the extent that it is desired, another photocell can be assigned to the feed channel 7 itself and arranged in the vicinity of its outlet side or at the outlet from the rollers 12, 13. The other photocell can accordingly replace a portion of the timing circuit and can supply a signal to the control 33 when the end of the sheet passes in order to stop the electric motor 28 and particularly to swivel the feed channel back into the initial position.

It is possible to control the beginning of the swiveling movements of the feed channel over time instead of by means of sensing devices or photocells.

In the embodiment shown, it is assumed that the electric motor 28 is immediately started up as soon as the photocell 48, 49 signals the arrival of a new sheet in the feed path 5 so that the rollers 9, 10, 12, 13 are driven in the forward rotational direction. The rollers, in any event, are already rotating when the sheet arrives at the inlet end 8 of the feed channel. However, it should be appreciated that for the purpose of aligning or properly positioning the sheet, or to avoid a slanted introduction into the feed channel 7, it is also possible to drive the roller first with a time delay, to wit, in such a manner that the sheet with its leading edge in the gap strikes the rollers 9, 10 which are then still at rest. The leading edge of the sheet then aligns itself in known manner parallel to the rollers 9, 10 while there occurs in the sheet a certain bulging. After the delay time is over, the electric motor 28 starts up the rollers in the forward rotational direction so that the rollers 8,9 draw the sheet in an aligned position, into the feed channel 7.

In order to obtain the same result, it is also possible to utilize the corresponding signal of the photocell 48, 49 by the control 33 for the driving of the electric motor 28 in a reverse rotational direction. In such a case, when the sheet with its leading edge reaches the rollers 9, 10, the latter are then already in motion in a reverse rotational direction. Since the sheet cannot enter the feed channel 7, it bulges and the leading edge of the sheet aligns itself parallel to the rollers 9, 10. After a corresponding time delay, the control 33 switches the electric motor 28 to reverse again and the sheet is drawn in, in aligned position, by the rollers which now rotate in the forward rotational direction.

As explained above, the sheet can be removed or ejected from the feed channel with a higher speed than the speed at which the sheet is drawn into the feed channel. By this means it is possible to shorten the time necessary for the sorting procedure. This is of importance particularly if output sites are present which make it necessary to tilt the feed channel about larger angles.

It should also be pointed out that wear on the members or elements which are driven by the electric motor 28 can be significantly reduced in that the motor is only switched on during the feeding of a sheet. This also of course reduces the current consumption of the apparatus. Instead of operating the apparatus so that the sorter or sorters obtain a sorting signal from the sheet delivering printer for each sheet, it is also feasible to design the control 33 in such a manner wherein a corresponding number of output sites are started up one after the other in a predetermined sequence, for example corresponding to a number of copies or sheets generated by the printer.

While a specific embodiment of the invention has been shown and described in detail to illustrate the application of the inventive principles, it will be understood that the invention may be embodied otherwise without departing from such principles.

What is claimed is:

1. An apparatus for sorting sheets, in particular sheets delivered from an office machine, comprising a support mounted for rotation about a swiveling axis, a pair of driven circulating members mounted to said support and defining a straight, elongated feed channel therebetween for receiving and feeding sheets to be sorted, said feed channel having an inlet and for receiving sheets and an outlet end for discharging sheets, said swiveling axis lying in the plane of said straight feed channel, drive means connected to said support for rotating said support about said swiveling axis, a take-up site positioned adjacent said support for receiving sheets to be sorted, a plurality of output sites spaced at least partly around said support for receiving sheets to be sorted, control means connected to said drive means for rotating said support on said swiveling axis between a position with said inlet end aligned with said take-up site for receiving sheets from said take-up site into said feed channel, to a position aligning said outlet end with one of said output sites for discharging a sheet from said feed channel into said one output site, said pair of circulating members comprising a first pair of rollers having a nip on said feed channel adjacent said inlet end, a second pair of rollers having a nip on said feed channel adjacent said outlet end, said swiveling axis lying near said first pair of rollers, and roller drive means operatively connected to said first and second pairs of rollers for jointly rotating said first and second pairs of rollers, and steering means operatively connected to said support for steering a sheet into a selected one of said output sites with said support rotated to align said outlet end of said feed channel with said selected output site, said steering means being connected to one of said second pair of rollers for changing the position of the nip of said second pair of rollers depending on the selected one of said output sites which is aligned with said outlet end of said feed channel, said support comprising a pair of spaced-apart shield plates to which said first and second pairs of rollers are rotatably mounted, said shield plates being rigidly connected to each other for rotation about said swiveling axis, said drive means for said support including a stepping motor engaged with at least one of said shield plates and connected to said control means for pivoting of said shield plates, said one of said second pair of rollers which is connected to said steering means having a pair of axle ends, said steering means including a curved slot in each of said shield plates for receiving each axle end so as to allow translation between each axle end and said shield plates.

2. An apparatus according to claim 1, wherein said steering means includes a housing having a guide groove for each of said shield plates, a slide block pivotally carrying each of said axle ends and slidably mounted in a respective one of said guide grooves for moving said roller carrying said axle ends with respect to the other one of said second rollers with rotation of said support about said swiveling axis, said housings carrying said take-up and output sites.

3. A method for sorting sheets, in particular sheets delivered one at a time from an office machine, using an apparatus including a take-up site position for receiving the sheets from the office machine, and a plurality of spaced apart output sites, the method comprising positioning the inlet end of a feed channel in alignment with the take-up site for receiving a sheet to be sorted, feeding the sheet to be sorted to the feed channel, while feeding is continued tilting the feed channel to align an outlet end thereof with a selected one of the output sites, feeding the sheet from the feed channel to the selected output site, and accelerating the rate of feed of the feed sheet through the feed channel as the feed channel is tilted to the selected output site, and further including tilting the feed channel after it has discharged a sheet into the selected output site back into a position aligning the inlet end of the feed channel with the take-up site for receiving another sheet to be sorted and tilting the feed channel to an initial position upon interruption of feed movement in the feed channel.

4. A method according to claim 3 including sensing for the presence of a sheet at the take-up site and feeding the sheet into the feed channel upon the sensing of the presence of the sheet at the take-up site.

5. A method according to claim 3 including feeding the sheet into the inlet end of the feed channel only after it has been fed against the inlet end of the feed channel, for aligning the sheet before it is fed into the feed channel.

6. An apparatus for sorting sheets, in particular sheets delivered from an office machine, comprising a support mounted for rotation about a swiveling axis, a pair of driven circulating members mounted to said support and defining a feed channel therebetween for receiving and feeding sheets to be sorted, said feed channel having an inlet end for receiving sheets and an outlet end for discharging sheets, drive means connected to said support for rotating said support about said swiveling axis, a take-up site positioned said support for receiving sheets to be sorted, a take-up slot arranged so as to allow receiving sheets to be taken up, a plurality of output sites spaced at least partly around said support for receiving sheets to be sorted, at least one of said plurality of output sites being a tray, control means connected to said drive means for rotating said support on said swiveling axis between a position with said inlet end aligned with said take-up slot for receiving sheets from said take-up site into said feed channel, to a position aligning said outlet end with one of said output sites for discharging a sheet from said feed channel into said one output site, and a housing carrying said take-up site and said plurality of output sites, said support being rotatably mounted about said swiveling axis to said housing, one of said output sites being an output slot provided so as to completely discharge a sheet from said housing, and wherein a second said apparatus is provided adjacent to said housing, said output slot being provided so as to discharge a sheet from said housing into said second apparatus.

7. An apparatus according to claim 6, wherein said second apparatus is provided on top of said housing.

* * * * *